United States Patent [19]
Carlyle et al.

[11] Patent Number: 5,325,750
[45] Date of Patent: Jul. 5, 1994

[54] MACHINE TOOL ASSEMBLY HAVING REPLICATED SUPPORT SURFACES

[75] Inventors: Robert B. Carlyle, Horseheads; Terrence M. Sheehan; Harold E. Walburn, both of Elmira; Brian M. Eaton, Pine City, all of N.Y.

[73] Assignee: Hardinge Brothers, Inc., New York, N.Y.

[21] Appl. No.: 788,043

[22] Filed: Nov. 5, 1991

[51] Int. Cl.$^5$ .............................. B23B 17/00
[52] U.S. Cl. ........................ 82/149; 408/234; 409/235; 29/402.18
[58] Field of Search ............ 82/149, 900, 147, 904; 29/402.09, 402.18; 408/234; 409/235

[56] References Cited

U.S. PATENT DOCUMENTS

| | | | |
|---|---|---|---|
| 2,010,557 | 8/1935 | Nenninger | 51/49 |
| 2,380,747 | 7/1945 | Goetze | 82/900 X |
| 3,618,432 | 11/1971 | Briese | 82/149 X |
| 3,800,636 | 4/1974 | Zagar | 408/234 X |
| 4,447,181 | 5/1984 | Asano | 82/904 X |
| 4,478,117 | 10/1984 | Brown et al. | 82/149 |
| 4,539,876 | 9/1985 | Myers et al. | 408/234 X |
| 4,657,455 | 4/1987 | Rogers et al. | 409/235 |
| 4,907,478 | 3/1990 | Brown et al. | 82/149 |
| 5,096,348 | 3/1992 | Winkler et al. | 409/235 |

OTHER PUBLICATIONS

ITW/Philadelphia Resins Corporation, Technical Bulletin No. 826.
Russel, Holbrook and Henderson, Inc., Product Brochure.
"Cast Polymers Speed Machine Tool Assembly"; Machine Design; Oct. 24, 1991; pp. 78–81.

Primary Examiner—Z. R. Bilinsky
Attorney, Agent, or Firm—Cushman, Darby & Cushman

[57] ABSTRACT

A process for replicating a surface on a machine base support surface relative to a reference surface, comprising the steps of providing a reference surface on the machine base; providing a fixture having a surface; positioning the fixture surface over the support surface to a predetermined position in close proximity to the support surface so that a gap is maintained between the fixture surface and the support surface; adjusting the fixture surface relative to the reference surface such that the fixture surface is precisely parallel with the reference surface; filling the space between the fixture surface and the support surface with flowable hardenable substance; permitting the substance to cure; removing the fixture.

8 Claims, 8 Drawing Sheets

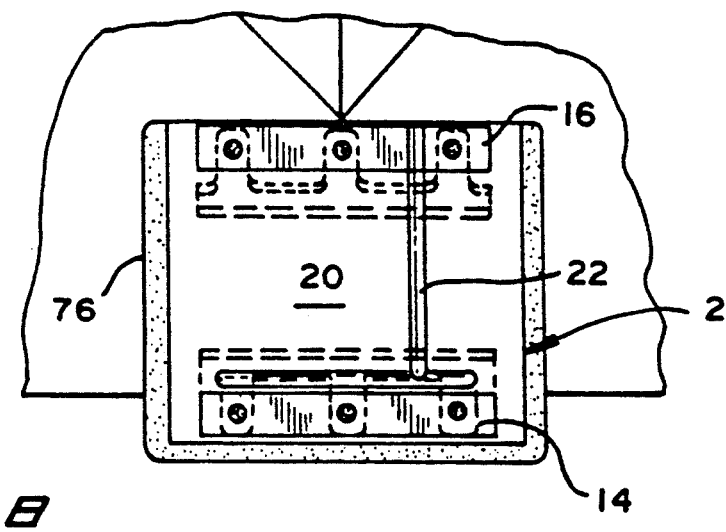
FIG_8
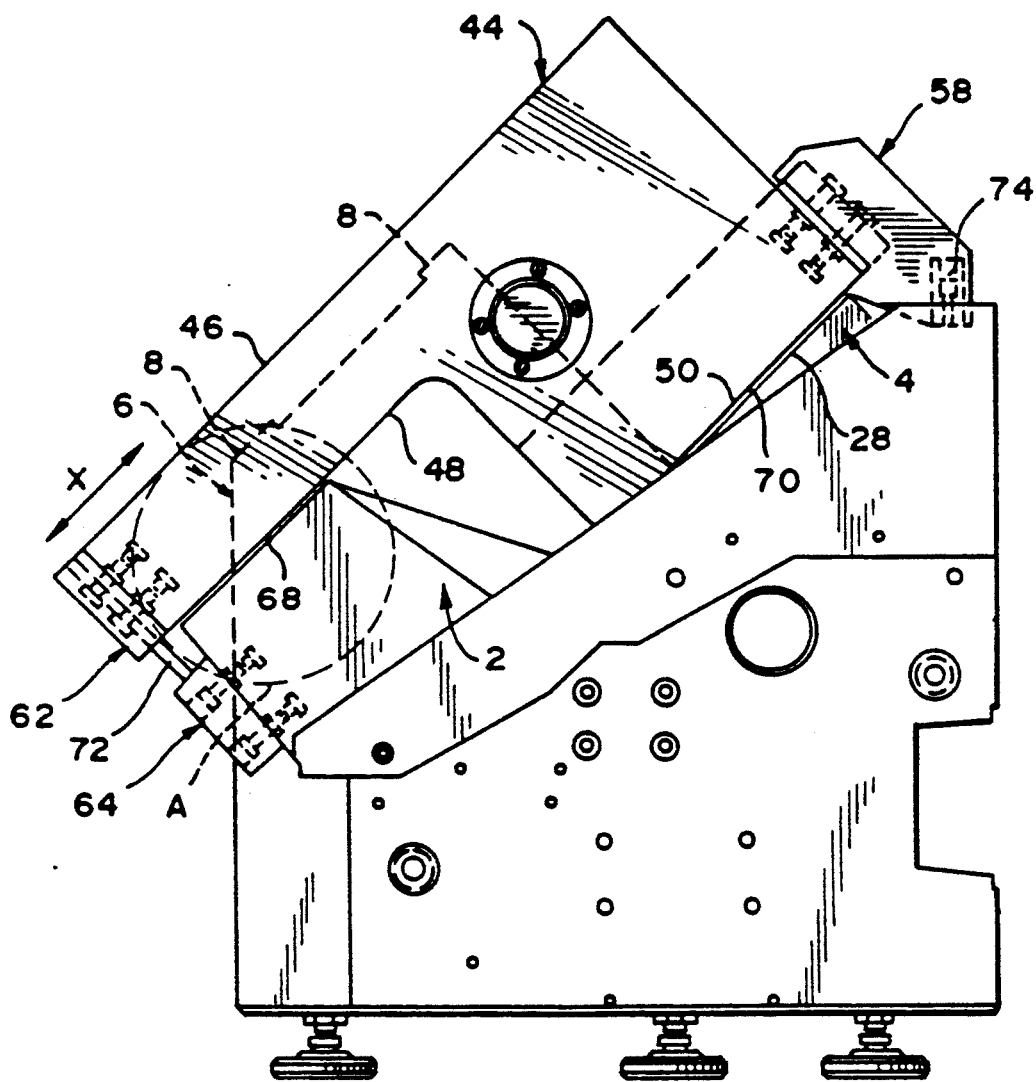
FIG_7

MACHINE TOOL ASSEMBLY HAVING REPLICATED SUPPORT SURFACES

FIELD OF THE INVENTION

The present invention relates generally to a machine base for supporting machine tools such as a lathe and the like, and in particular to a machine base made of cementitious material and having parallel support surfaces for a headstock assembly and a guideway structure.

BACKGROUND OF THE INVENTION

A machine tool such as a lathe has one or more movable cutting elements which operate on a work piece rotated by a spindle or headstock assembly. The headstock and the movable components are mounted to a base, which typically is made of metal, although cementitious materials are known.

The conventional machine tool base is a large bulky assembly to which the operating components are attached. The bedways on which the cutting elements move and the headstock support structure are typically manufactured from metal, such as steel or cast iron, and must be secured to the base. Positive securement of a fabricated metal component to a cementitious base requires that alignment be maintained with extreme accuracy for a machine tool that operates within extremely small tolerances. Grouting of the metal components to a cementitious base has been used in the past. However, grouting has some drawbacks, such as difficulty of accurately aligning the bedways due to the shrinkage forces generated by the grout during curing and the limited burial depth of the bedways into the cementitious base.

OBJECTS AND SUMMARY OF THE INVENTION

It is an object of the present invention to provide a machine base made of cementitious material, such as concrete, for providing precisely parallel support surfaces to the headstock and operating components of a machine tool without the disadvantages of grouting.

It is another object of the present invention to provide a machine base made of cementitious material, such as concrete, that has relatively deep metal inserts cast into the base to which the headstock and the guideways are secured for relatively extremely rigid structure.

It is still another object of the present invention to provide a machine base made of cementitious material, such as concrete, that has precisely parallel support surfaces to which the headstock and the guideways are secured.

It is yet another object of the present invention to provide a machine base made of cementitious material, such as concrete, that has precisely parallel support surfaces for the headstock assembly and the operating guideways without machining the entire base.

It is an object of the present invention to provide a machine base that has relatively excellent vibration absorbing characteristics, and relatively predictable thermal growth.

In summary, the present invention provides a machine base that has precisely parallel surfaces to which the headstock assembly and the metallic guideways of the machine tool are secured and has relatively excellent vibration absorbing and thermal characteristics.

These and other objects of the present invention will become apparent from the following detailed description.

BRIEF DESCRIPTIONS OF THE DRAWINGS

FIG. 7 is a right hand elevational view of the machine base in FIG. 1, showing the granite fixture in FIG. 4 secured in close proximity thereto.

FIG. 8 is an enlarged top plan view of one of the support surfaces for receiving a replicated surface in accordance with the present invention, the view being normal to the surface.

DETAILED DESCRIPTION OF THE INVENTION

Figure 1:
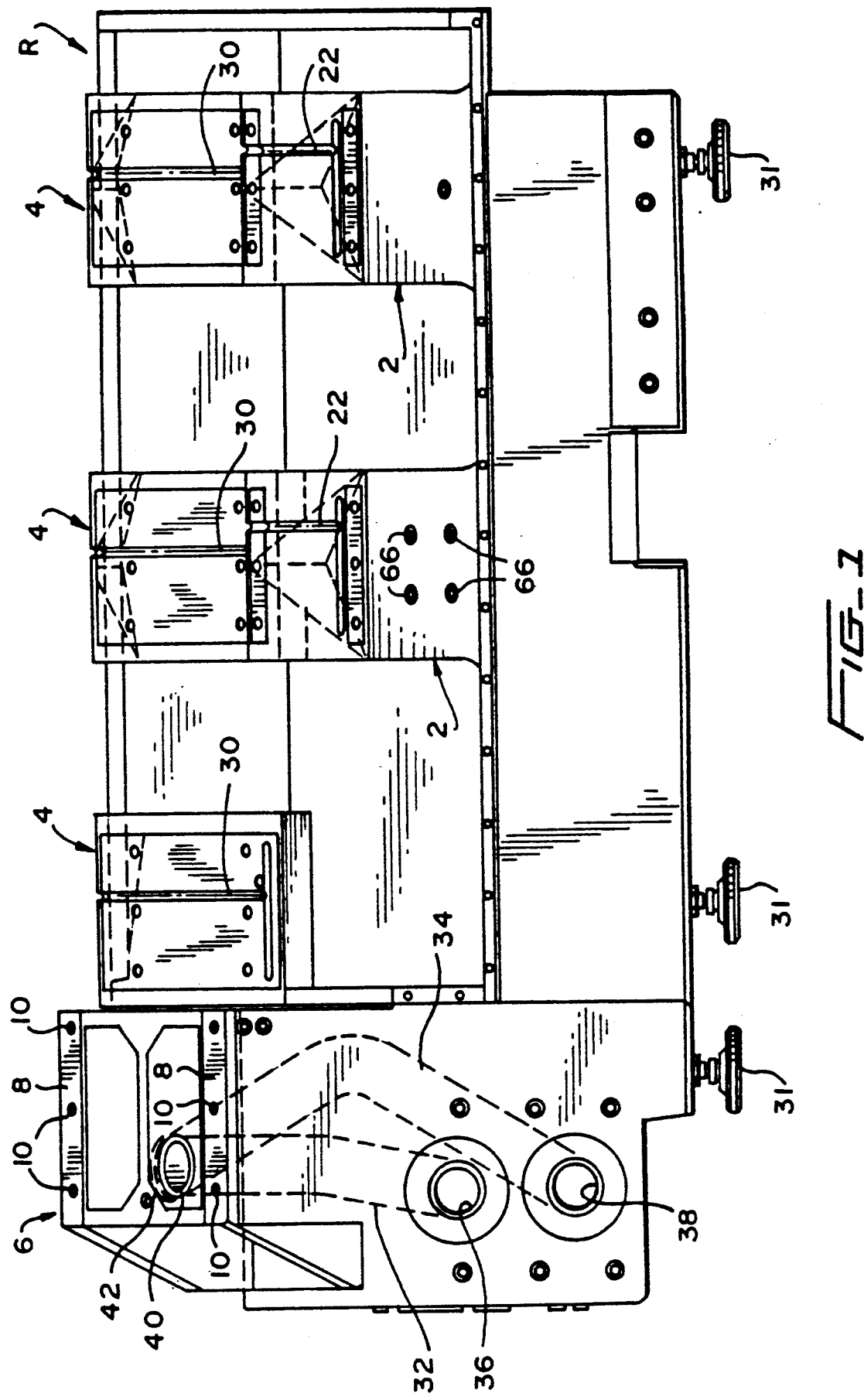
FIG. 1 is a front elevational view of a machine base prior to surface replication.

A machine base R prior to surface replication is disclosed in FIG. 1. The machine base is preferably made from cementitious material, such as concrete, for its relatively excellent vibration absorbing characteristic. A row of two front pedestals 2 extends upwardly from a lower portion of the base R and provides a support structure to a metallic guideway (not shown). A row of three rear pedestals 4 similarly extends upwardly from the bottom portion of the machine base R for providing another support structure for another metallic guideway (not shown). A metallic headstock support structure 6 is cast into one end of the machine base R and extends upwardly from the lower portion of the machine base R.

Figure 3:
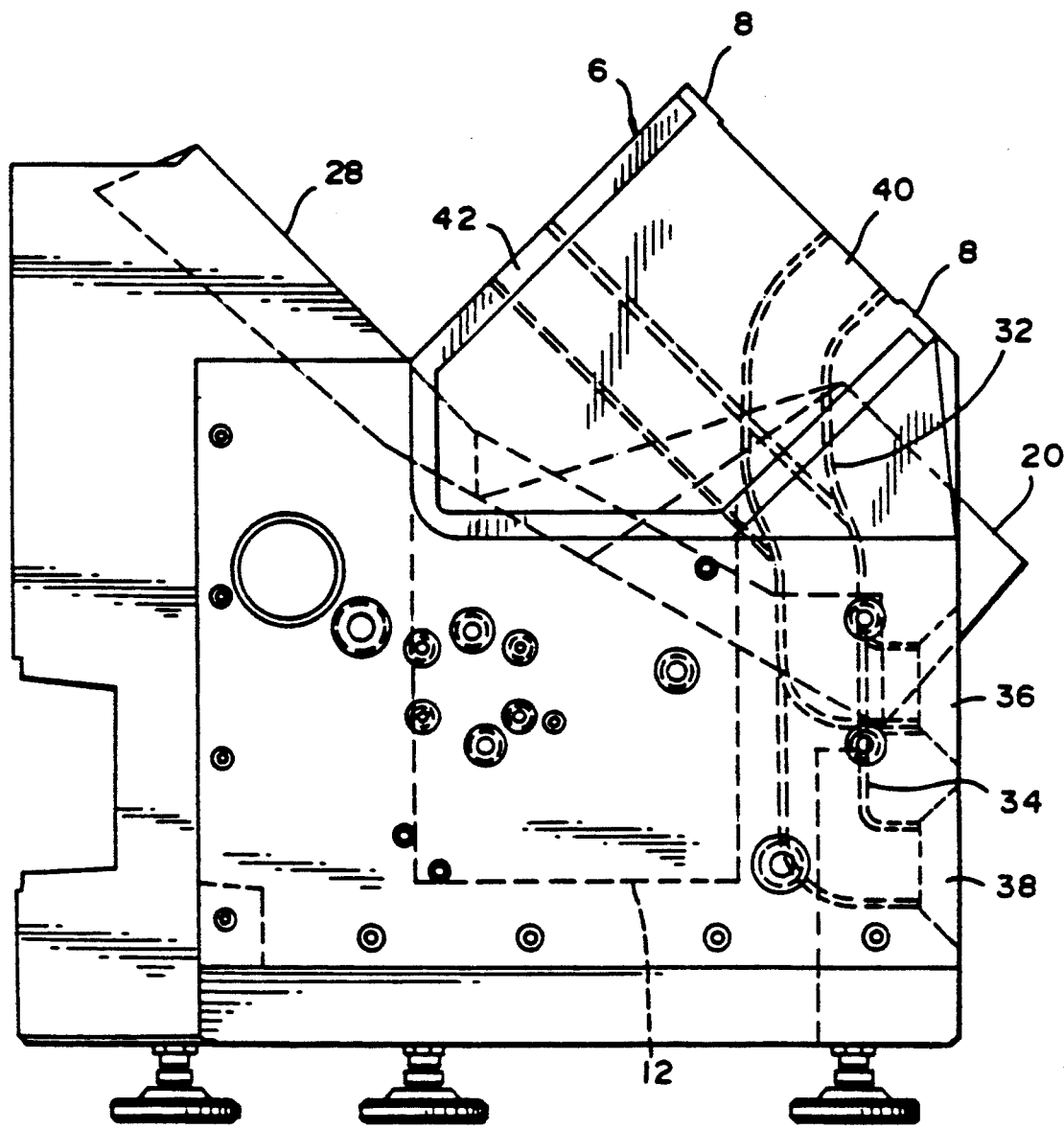
FIG. 3 is a left side elevational view of the machine base shown in FIG. 1.

The support structure 6 has a pair of parallel surfaces 8 with a plurality of threaded holes 10 for supporting and securing a headstock assembly (not shown). The support structure 6 has a portion 12 that is cast into the concrete base R, as best shown in FIG. 3. The portion 12 is substantially disposed into the base R, thereby to provide the support structure 6 relatively greater resistance to bending and vibration absorbing capabilities, as best shown in FIG. 3. The support structure 6 advantageously has substantially uniform cross-section throughout its length for relatively uniform thermal growth.

Each of the front pedestals 2 has metallic inserts 14 and 16 that are advantageously cast into the base R at relatively greater depth for greater rigidity and vibration absorption. Each of the inserts 14 and 16 has threaded openings 18 used for securing a tailstock guideway (not shown) thereto. Each of the front pedestals 2 has a top surface 20 with a "T"-shaped groove 22 disposed thereon. The surface 20 provides a support surface for a replicated surface formed from a layer of hardenable substance, as will be discussed below.

Figure 2:
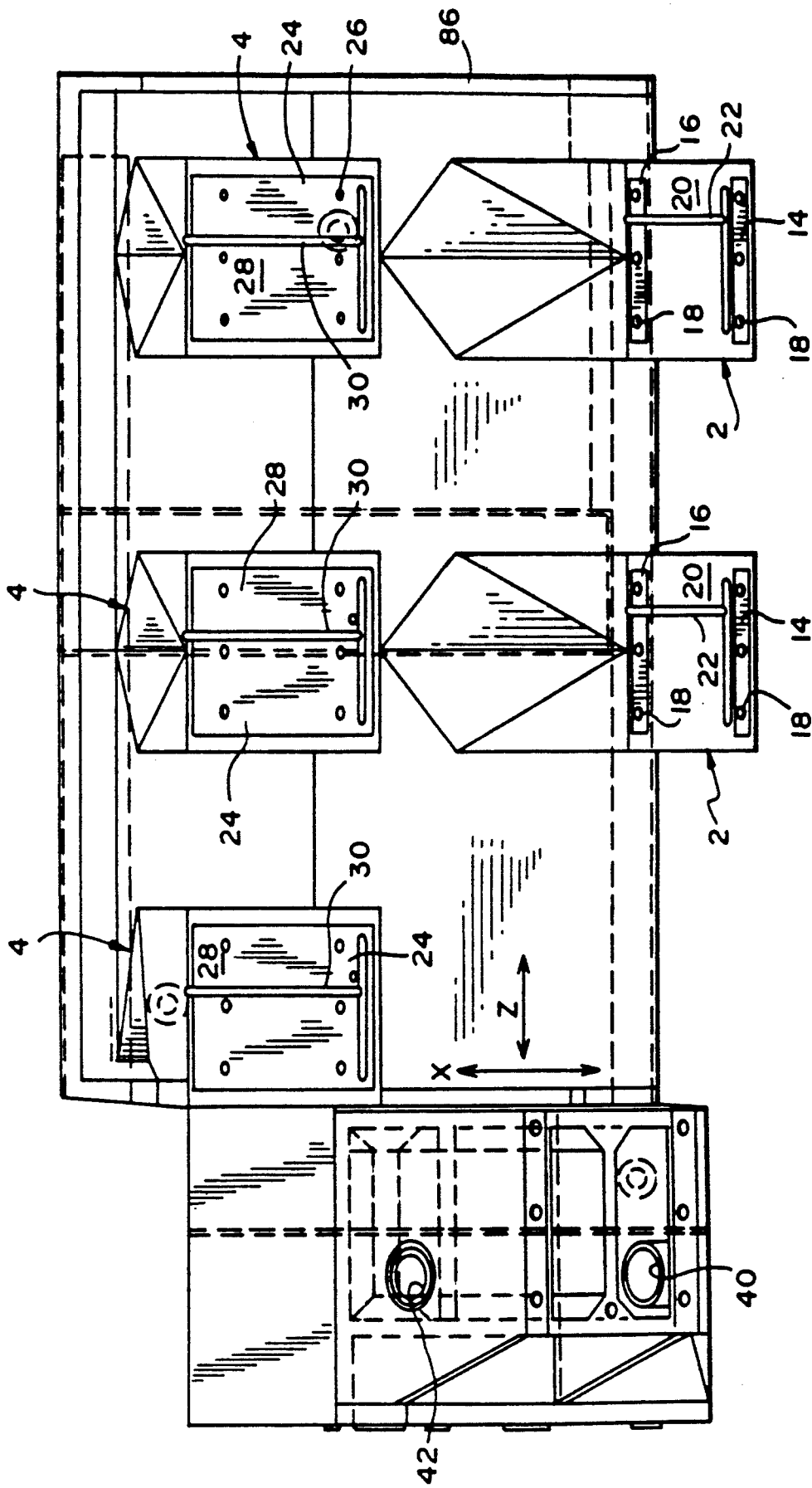
FIG. 2 is a top plan view of the machine base shown in FIG. 1.

Each of the rear pedestals 4 has a metallic insert 24 with a plurality of threaded openings 26 for securing thereto a metallic guideway (not shown). The inserts 24 are advantageously cast into the base R at relatively greater depth for greater rigidity and vibration absorption. Each of the rear pedestals 4 has a top surface 28 on which is disposed a "T"-shaped groove or slot 30, as best shown in FIG. 2. The surface 28 provides a support surface for a replicated surface formed from a layer of hardenable substance, as will be discussed below.

The surfaces 20 and 28 are shown in FIGS. 1, 2 and 3 prior to formation of replicated surfaces.

The base R is supported by adjustable supports 31. Conduit 32 and 34 are cast into the base R and provide means for conveying cooling air from inlets 36 and 38 to outlets 40 and 42 to cool the headstock assembly (not shown) that would be bolted to the support structure 6 at surfaces 8, as best shown in FIGS. 1, 2 and 3.

Figure 6:
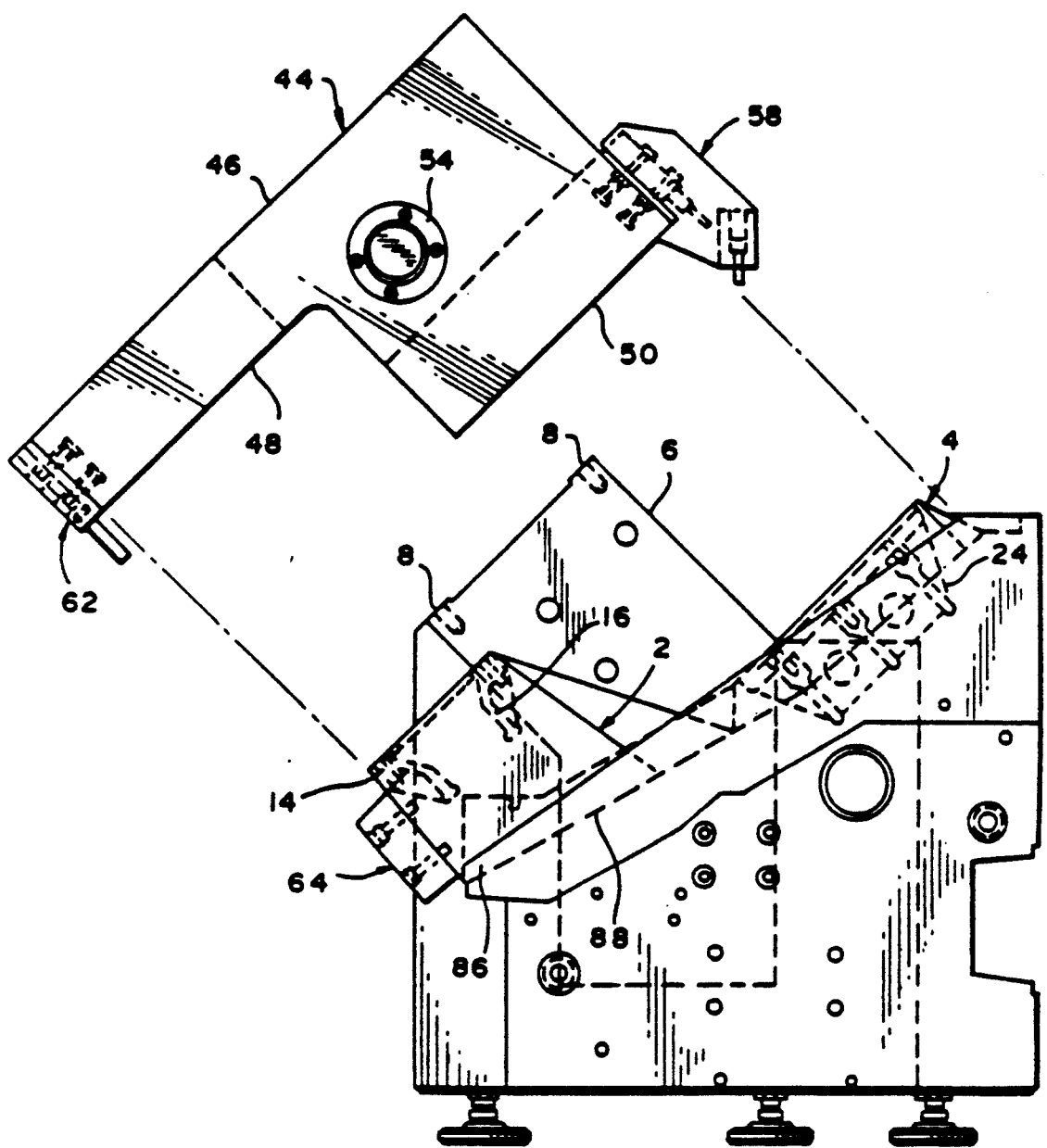
FIG. 6 is a right side elevational view of the machine base in FIG. 1, showing the granite fixture in FIG. 4 in exploded relationship thereto.

A granite fixture 44 is used in replicating surfaces on the support surfaces 20 and 28 on top of the pedestals 2 and 4 that will be precisely parallel to the surfaces 8 on the headstock support structure 6. The fixture 44 has surfaces 46, 48 and 50 that are precisely parallel to each other, as best shown in FIG. 6. Surfaces 48 and 50 must have no pores. The granite fixture 44 is preferably black granite and weighs approximately 2500 lbs.

Figure 4:
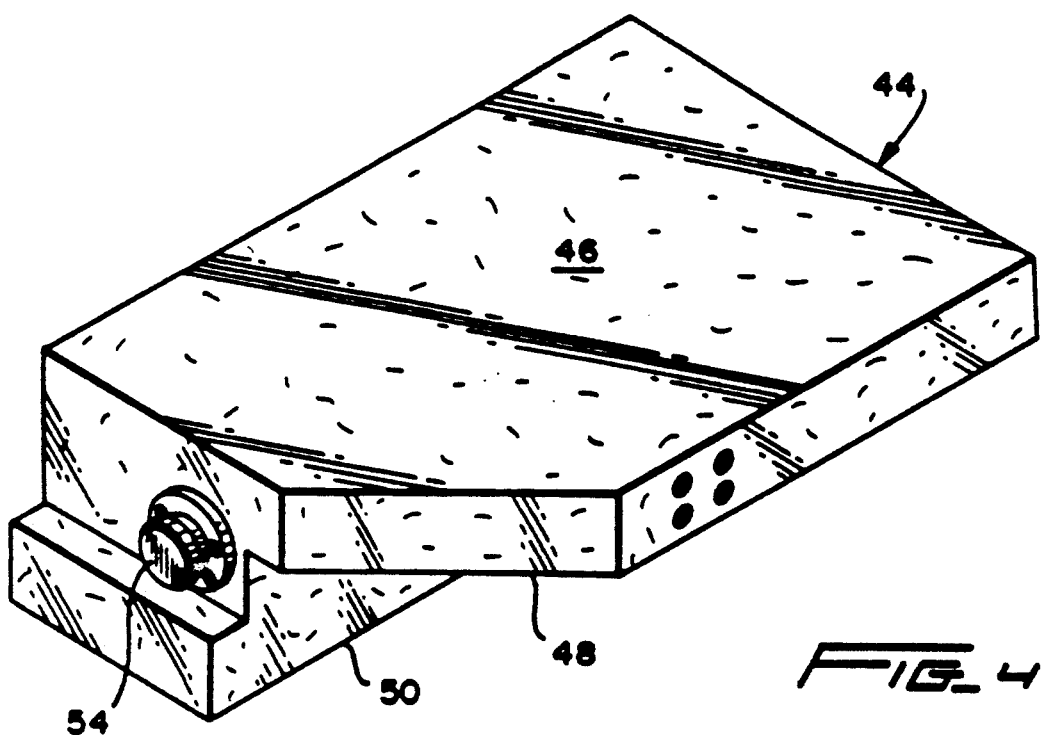
FIG. 4 is a perspective view of a granite fixture used in the present invention.
Figure 5:
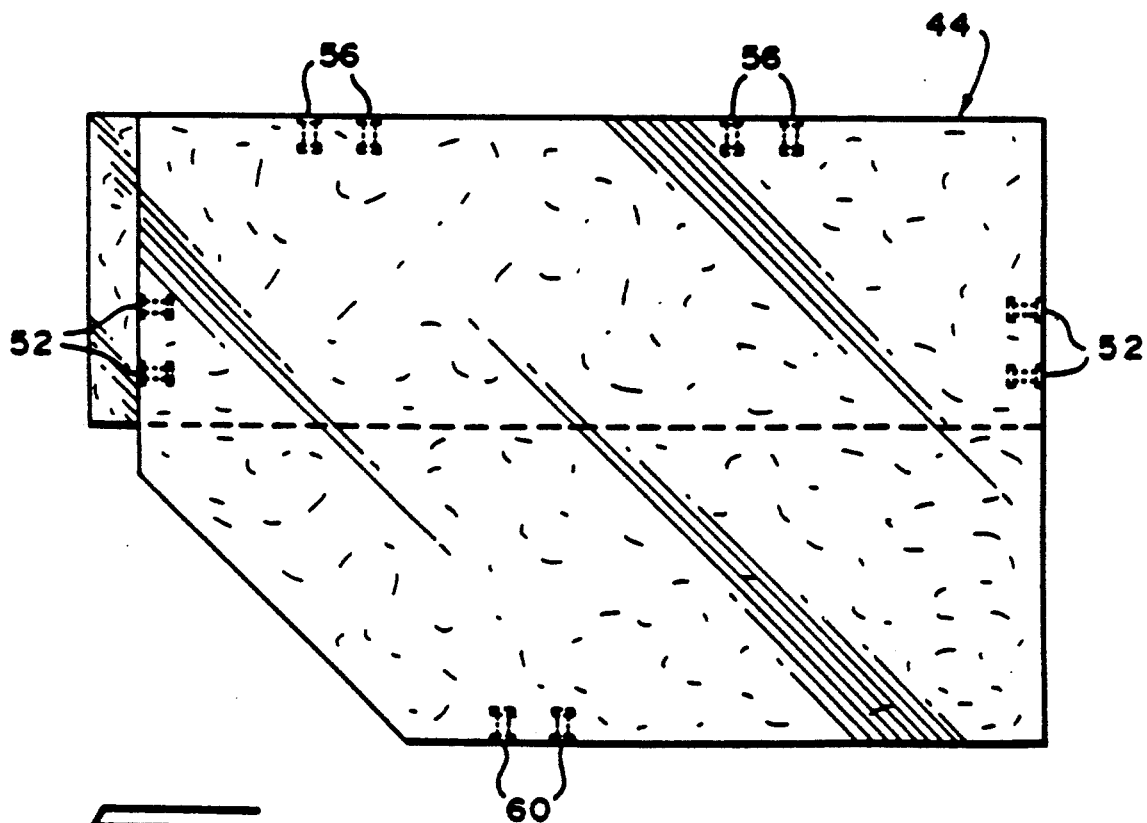
FIG. 5 is a top plan view of the granite fixture shown in FIG. 4.

Threaded inserts 52 are used to secure lifting lugs 54 and are advantageously located along a line through the center of gravity of the fixture 44, as best shown in FIGS. 4 and 5. Threaded inserts 56 disposed along the rear edge of the granite fixture 44 are used to secure a leveling bracket 58, as best shown in FIGS. 5 and 6. Threaded inserts 60 disposed along the front edge of the granite fixture 44 are used to secure another leveling bracket 62, as best shown in FIGS. 5 and 6. A bottom leveling bracket is secured to one of the front pedestals 2 by means of screws received in threaded inserts 66, as best shown in FIGS. 1 and 6.

The granite fixture 44 is positioned in close proximity on top of the pedestals 2 and 4, as best shown in FIG. 7. A gap 68 is maintained between surface 48 of the granite fixture 44 and the top surface 20 of the pedestals 2. Similarly, a gap 70 is maintained between the surface 50 of the granite fixture 44 and the top surface 28 of the rear pedestal 4, as best shown in FIG. 7. A front leveling screw 72 and a pair of rear leveling screws 74 provide a three point alignment means for leveling the top surface 46 of the granite fixture 44 relative to the reference surfaces 8. The distance between the top surface 46 and the surfaces 8 are adjusted precisely parallel to each other, preferably within a tolerance of 0.002 in. along the Z and X directions, as best shown in FIGS. 2 and 7. The distance between the surfaces 48 and 50 and between the surfaces 8 and 28 are similarly made precisely parallel to each other. The gaps 68 and 70 are a small increment, typically in the neighborhood of 0.060 in.

Figure 10:
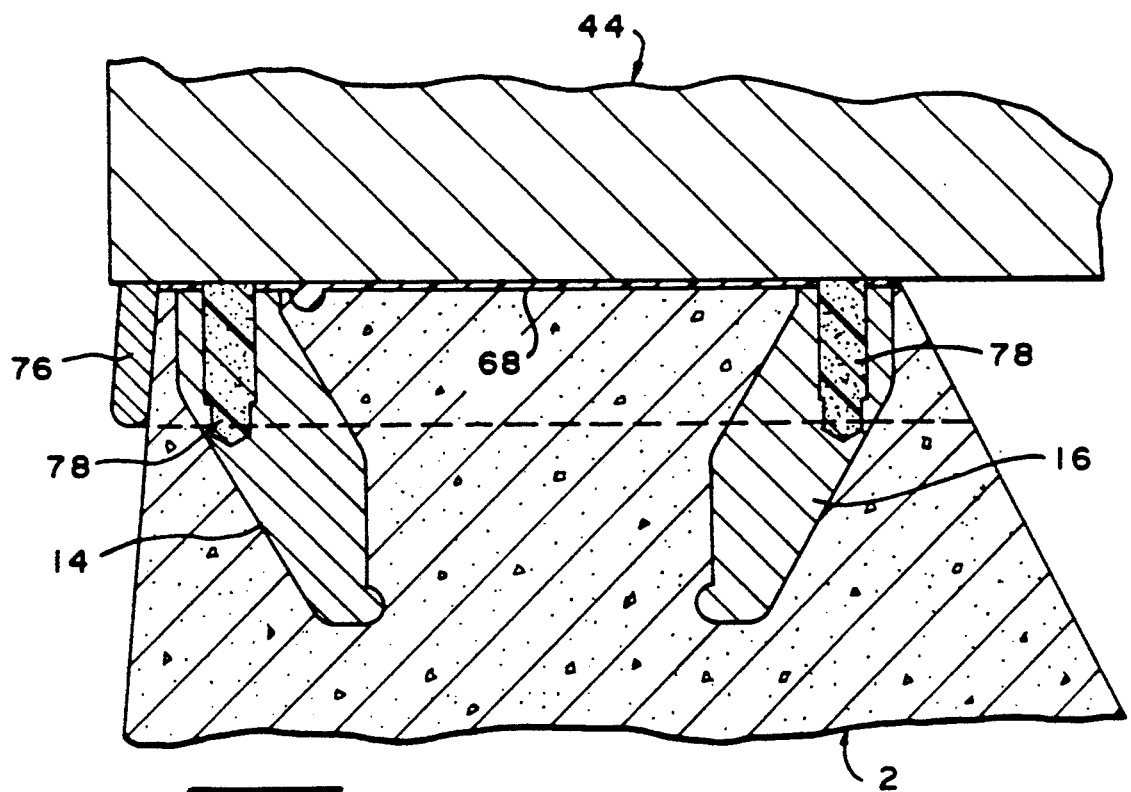
FIG. 10 is an enlarged cross-sectional view of detail A in FIG. 7 taken along a line through a pair of plugged threaded openings.

A dam 76 is provided around the bottom and the inclined periphery of each of the pedestals 2 and 4, as best shown in FIG. 8. The surfaces 8, 20 and 28 are preferably inclined upwardly from the front at 45 degrees. The dam 76 is preferably closed cell sponged with adhesive tape backing. The dams 76 are installed before the fixture 44 is secured in place. The threaded openings 18 and 26 on top of the pedestals 2 and 4, respectively, are filled with plugs 78, as best shown in FIG. 10. The plugs 78 are preferably closed cell sponge.

The surfaces 48 and 50 of the granite fixture 44 are prepared prior to securing to the base R with a release agent, preferably three coats of mold release wax. Each coat of wax is allowed to dry for approximately 5 minutes and then buffed off before the next coat of wax is applied. The surfaces 20 and 28 on the pedestals 2 and 4, respectively, are preferably cleaned with trichloroethylene prior to positioning the granite fixture 44 thereon.

After the granite fixture 44 is secured to the base R, as best shown in FIG. 7, the leveling screws 72 and 74 are adjusted in conjunction with a height gauge or other suitable instrument to position the granite fixture 44 precisely parallel with the reference surfaces 8. The leveling screws 72 and 74 are then locked in place.

Figure 9:
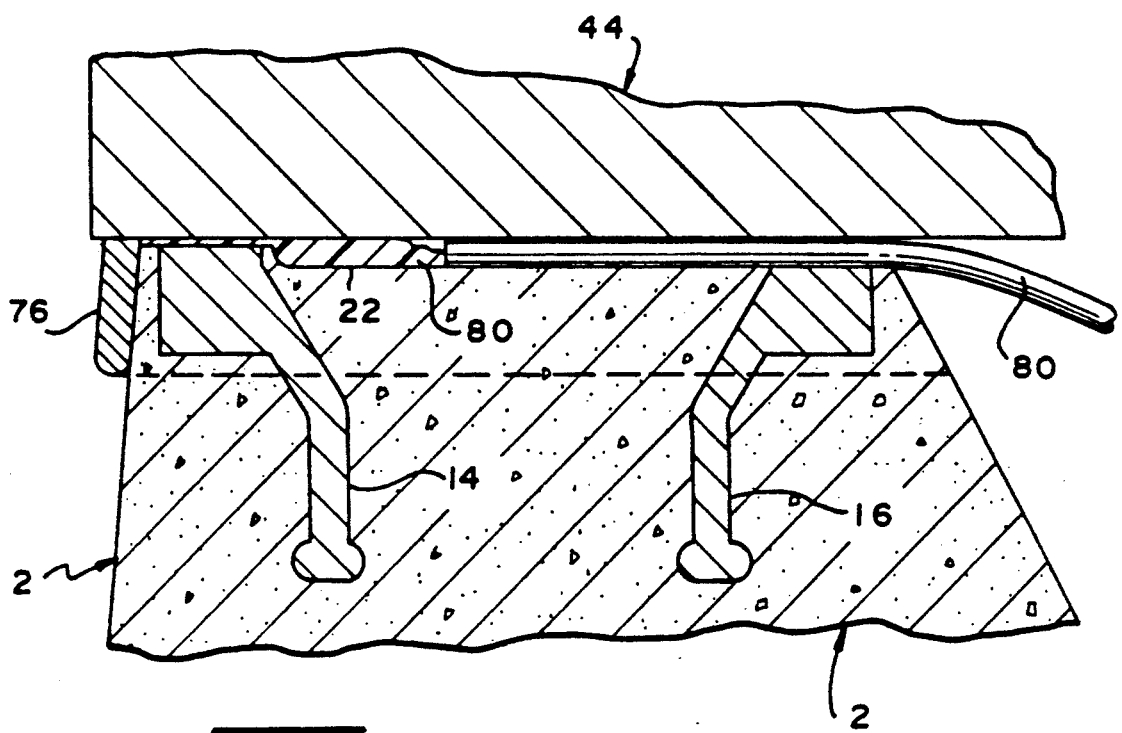
FIG. 9 is an enlarged cross-sectional view of detail A in FIG. 7 taken along an injection slot, showing injection of a flowable hardenable substance into a gap formed between the granite fixture and the support surface.

A flowable and hardenable resin 80 is then injected into the gaps 68 and 70 by means of a flexible tube 81 that is inserted into each of the grooves 22 and 30, as best shown in FIG. 9. The resin 80 is a precision setting and high lubricity polymer made for the machine tool industry. The resin 80 is specially formulated, 100% solids, two-component, inert filled casting compound available from ITW/Philadelphia Resins Corporation, Montgomeryville, Pa. It is sold under the name Super Alloy Silver 500. The resin 80 advantageously has relatively negligible shrinkage, excellent flowability, dimensional stability, high compressive strength, high modulus of elasticity, creep resistance, dampening properties and lower inertia compared to metal.

Each of the gaps 68 and 70 are filled with the resin 80 from the bottom up, allowing air to escape. The resin 80 is then allowed to cure undisturbed for approximately 18 hours.

After the cure period, the granite fixture 44 is removed. The dam 76 and the plugs 78 are also removed.

Figure 11:
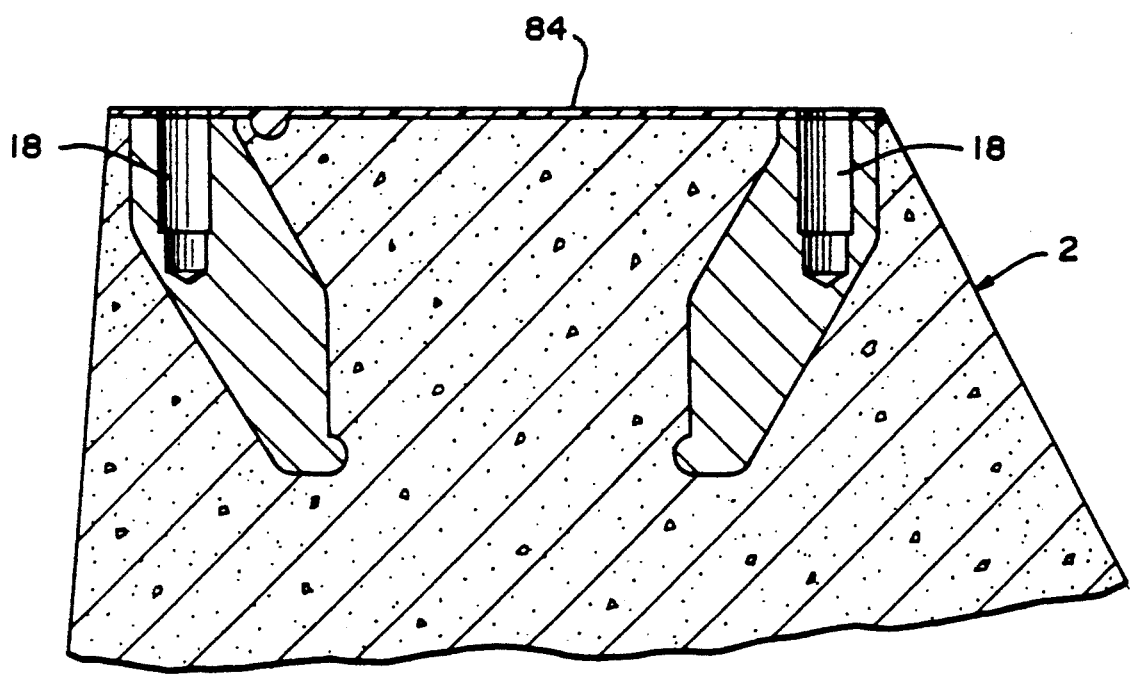
FIG. 11 is an enlarged cross-sectional view similar to FIG. 10, showing a replicated surface after the granite fixture has been removed.

A replicated surface 84 is thus created on top of each of the support surfaces 20 and 28 of the pedestals 2 and 4, respectively, that are precisely parallel with the reference surfaces 8, as best shown in FIG. 11. The surfaces 84 on the front pedestals 2 are co-planar with each other and precisely parallel with the surfaces 8 and the other replicated surfaces on the rear pedestals 4. The surfaces 84 on the rear pedestals 4 are co-planar with each other and precisely parallel with the reference surfaces 8 and the replicated surfaces on the front pedestals 2. A person of ordinary skill in the art will understand that the surfaces 84 are now ready to receive a machined metallic guideway without further leveling adjustments in reference to the surfaces 8.

The granite fixture 44 is preferably positioned at a 45° angle to advantageously eliminate porosity in the replicated surfaces 84.

A ledge 86 (FIG. 6) is disposed around the rear and the two opposite sides of the base R, as best shown in FIGS. 2 and 6. The base R has an inclined surface 88, as best shown in FIG. 6.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A machine tool assembly, comprising:
 a) a base;
 b) a headstock support surface disposed in one end of said base;
 c) a bedway support surface disposed on said base; and
 d) a layer of resin disposed on said bedway support surface defining a top surface substantially parallel with said headstock support surface.

2. A machine tool assembly as in claim 1, wherein:
 a) said base is concrete;
 b) a metallic headstock support insert is disposed in said base, said headstock support insert including said headstock support surface; and
 c) a metallic bedway support insert is disposed in said base, said bedway support insert including said bedway support surface.

3. A machine tool assembly as in claim 2, wherein:
 a) said headstock support insert is cast into said base.

4. A machine tool assembly as in claim 2, wherein:
 a) said bedway support insert is cast into said base.

5. A machine base as in claim 1, wherein:
 a) said bedway support surface is inclined relative to a vertical axis.

6. A machine tool assembly as in claim 1, wherein:
 a) said base includes means for routing cooling air therethrough for a headstock assembly.

7. A machine tool assembly as in claim 6, wherein:
 a) said routing means includes a conduit formed in said base.

8. A machine tool assembly as in claim 1 wherein said resin layer is formed from a flowable and hardenable 100% solids casting compound.

* * * * *